United States Patent
Bell, Jr. et al.

(10) Patent No.: US 6,604,145 B1
(45) Date of Patent: *Aug. 5, 2003

(54) METHOD AND SYSTEM FOR CONTROLLING INFORMATION FLOW IN A HIGH FREQUENCY DIGITAL SYSTEM FROM A PRODUCER TO A BUFFERING CONSUMER VIA AN INTERMEDIATE BUFFER AND A SHARED DATA PATH

(75) Inventors: Robert Henry Bell, Jr., Austin, TX (US); Robert Alan Cargnoni, Austin, TX (US); Leo James Clark, Georgetown, TX (US); William John Starke, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/436,963

(22) Filed: Nov. 9, 1999

(51) Int. Cl.[7] .............................................. G06F 15/16
(52) U.S. Cl. ...................... 709/232; 709/229; 709/233; 370/230; 370/259
(58) Field of Search ................................. 709/203, 215, 709/217, 226–228, 232, 233, 312, 313; 370/235, 352, 353, 431–433, 439, 400, 410, 412, 414, 416, 259, 230; 379/165

(56) References Cited

U.S. PATENT DOCUMENTS

| | | | | |
|---|---|---|---|---|
| 5,274,644 A | * | 12/1993 | Berger et al. | 370/95.1 |
| 5,291,481 A | * | 3/1994 | Doshi et al. | 370/230 |
| 5,392,280 A | * | 2/1995 | Zheng | 370/353 |
| 5,646,943 A | * | 7/1997 | Elwalid | 370/230 |
| 5,650,994 A | * | 7/1997 | Daley | 370/259 |
| 5,898,670 A | * | 4/1999 | Hoebeke et al. | 370/468 |
| 5,938,749 A | * | 8/1999 | Rusu et al. | 710/54 |
| 5,996,013 A | | 11/1999 | Delp et al. | |
| 6,052,738 A | * | 4/2000 | Muller et al. | 709/250 |
| 6,259,698 B1 | * | 7/2001 | Shin et al. | 370/395.7 |

OTHER PUBLICATIONS

Sakurai et al., "Large–Scale ATM Multistage Switching Network with Shared Buffer Memory Switches," IEEE Communications, vol. 29, No. 1 pp. 90–96 (Jan. 1991).*
Fong et al., "Analytical Modeling of Multistage ATM Switches with Backpressure Control Schemes," Broadband Switching Systems Proceedings, 1997. IEEE BSS '97., 1997 2nd IEEE International Workshop on, 1997 pp.: 72–83.*

* cited by examiner

*Primary Examiner*—Meng-Al T. An
*Assistant Examiner*—Wen-Tai Lin
(74) *Attorney, Agent, or Firm*—Volel Emile; Bracewell & Patterson, L.L.P.

(57) ABSTRACT

An information handling system includes a plurality of producers that output packets of information, at least one consumer of the packets, and an information pipeline coupling the consumer and at least a particular producer among the plurality of producers. The information pipeline includes a shared resource having a bandwidth shared by multiple of the plurality of producers. The information handling system further includes a control unit that regulates packet output of the particular producer and that receives as inputs a producer output indication indicating that the particular producer output a packet and a shared resource input indication indicating that a packet output by the particular producer has been accepted by the shared resource for transmission to the consumer. Based upon these inputs, a number of grant messages output to the particular producer within a feedback latency of the control unit, and a portion of the bandwidth allocated to the particular producer, the control unit whether the particular producer can output a packet without packet loss. In response to a determination that the particular producer can output a packet without packet loss, the control unit outputs a grant message to the particular producer indicating that the particular producer is permitted to output a packet.

39 Claims, 7 Drawing Sheets

METHOD AND SYSTEM FOR CONTROLLING INFORMATION FLOW IN A HIGH FREQUENCY DIGITAL SYSTEM FROM A PRODUCER TO A BUFFERING CONSUMER VIA AN INTERMEDIATE BUFFER AND A SHARED DATA PATH

CROSS-REFERENCE TO RELATED APPLICATIONS

This application is related to the following co-pending applications, which were filed on even date herewith and are incorporated herein by reference:

(1) U.S. application Ser. No. 09/436,962;
(2) U.S. application Ser. No. 09/436,960, patent issued; and
(3) U.S. application Ser. No. 09/436,961, patent issued.

BACKGROUND OF THE INVENTION

1. Technical Field

The present invention relates in general to high frequency digital systems and, in particular, to controlling the flow of information between a producer and a consumer in a high frequency digital system. Still more particularly, the present invention relates to a method and system for controlling the flow of information in a high frequency digital system from multiple memoriless producers to one or more buffering consumers via a shared resource.

2. Description of the Related Art

As processor micro-architectures are optimized toward implementations that support higher clock frequencies, the complexity of the work that can be performed within each clock cycle decreases. This phenomenon has a tendency to introduce increased cycletime latency into mechanisms which control the flow of information between components in the micro-architecture, effectively delaying critical feedback within such mechanisms and eroding the aggregate bandwidth of the information flow.

This bandwidth erosion occurs when the buffering capacity of downstream components approaches full occupancy, such that the fill time of the remaining available capacity approaches the latency of feedback in the information flow control mechanism. In such cases, the information flow control mechanism often must pessimistically assume worst case information flow to avoid exceeding the buffering capacity of the downstream components. Thus, for example, the information flow control mechanism may assume that information is being sent (and stall information flow appropriately based on downstream capacity considerations) whether or not information is actually sent in order to avoid overflowing the downstream buffers.

In many cases, such bandwidth erosion can be averted by increasing the buffering capacity of downstream components to minimize the likelihood that high utilizations will dictate precautionary stalls. However, an increase in buffering capacity also raises component cost without providing additional benefit beyond a reduction in bandwidth erosion. In other cases, more sophisticated flow protocols can be introduced, which tolerate information loss due to aggressive capacity speculation by incorporating retry mechanisms. However, such mechanisms can greatly increase complexity, thus inhibiting design verification and testability. Moreover, retry protocols also increase the utilization of the upstream component, possibly requiring an increase in its size and cost.

The present invention offers an attractive alternative for addressing the obstacles to efficient information flow that arise in high frequency digital systems that control, monitor, or perform transformations on streaming information.

SUMMARY OF THE INVENTION

In accordance with the present invention, an information handling system, such as a processor, includes a plurality of producers that output packets of information, at least one consumer of the packets, and an information pipeline coupling the consumer and at least a particular producer among the plurality of producers. The information pipeline includes a shared resource having a bandwidth shared by multiple of the plurality of producers. The information handling system further includes a control unit that regulates packet output of the particular producer and that receives as inputs a producer output indication indicating that the particular producer output a packet and a shared resource input indication indicating that a packet output by the particular producer has been accepted by the shared resource for transmission to the consumer. Based upon these inputs, a number of grant messages output to the particular producer within a feedback latency of the control unit, and a portion of the bandwidth allocated to the particular producer, the control unit whether the particular producer can output a packet without packet loss. In response to a determination that the particular producer can output a packet without packet loss, the control unit outputs a grant message to the particular producer indicating that the particular producer is permitted to output a packet.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
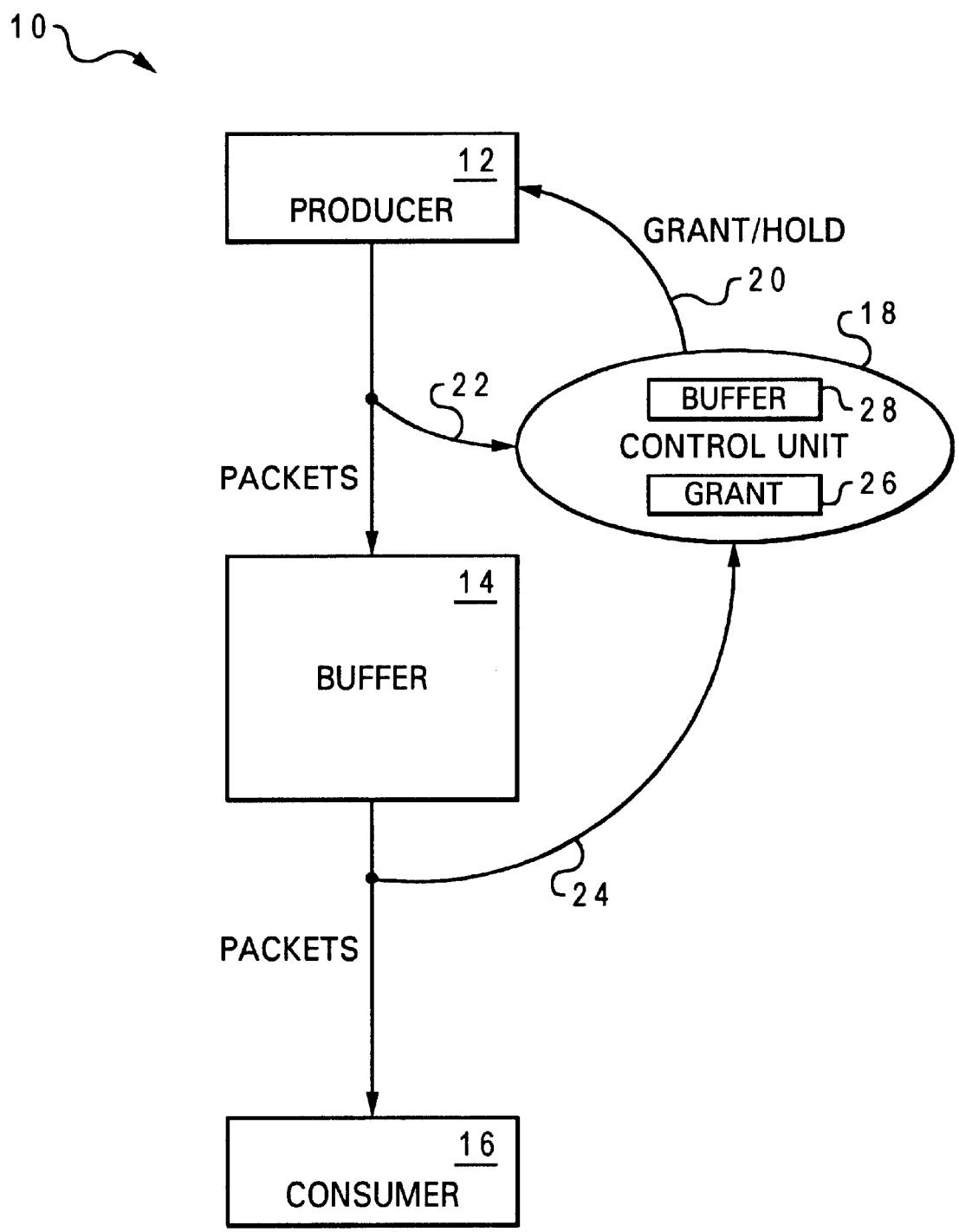
FIG. 1 illustrates a block diagram of a first exemplary embodiment of a high frequency digital system in which information flow between a producer and a consumer via a buffer is efficiently controlled in accordance with the present invention.

With reference now to the figures and in particular with reference to FIG. 1, there is illustrated a block diagram of a first exemplary embodiment of a high frequency digital system 10 in which information flow is efficiently controlled in accordance with the present invention. As shown, digital system 10 includes a producer 12, which produces information packets and outputs the information packets to a consumer 16 via an intermediate buffer 14 having a known, finite capacity of packets G. Producer 12 is memoriless, meaning that after producer 12 outputs a packet, producer 12 retains no knowledge of the packet or its transmission and hence cannot reproduce the packet if it is lost.

Packets are transferred from producer 12 to buffer 14 subject to a bandwidth constraint J, which defines a maximum number of packets that can be transferred by producer 12 per discrete clock tick, and subject to a latency constraint K, which is defined as the number of discrete clock ticks that elapse in the interval between a packet leaving producer 12 and arriving at buffer 14. Packets are transferred from buffer 14 to consumer 16 subject to a bandwidth constraint P, which defines a maximum number of packets that buffer 14 can output per discrete clock tick, and subject to a latency constraint Q, which is defined as the number of discrete clock ticks that elapse in the interval between a packet leaving buffer 14 and arriving at consumer 16.

In order to maximize the aggregate bandwidth of packets transferred from producer 12 to buffer 14 while insuring that none of the packets output by producer 12 are lost due to exceeding (overflowing) the capacity G of buffer 14, the present invention implements a control unit 18 to regulate the flow of packets from producer 12 to buffer 14. Control unit 18 reacts to available information by determining how many packets producer 12 will be permitted to send at a given clock tick (i.e., 0–J) and by communicating that determination to producer 12 via grant/hold signal line 20. A grant signal, indicating that a specified number of packets may be transmitted, or hold signal, indicating that no packets may be transmitted, is subject to a latency Y, which specifies the number of clock ticks that elapse between the generation of a grant or hold signal by control unit 18 and the reaction to the grant or hold signal by producer 12. Producer 12 cannot send any packets if a hold signal is received and might not send packets to buffer 14 for a given clock tick even when a grant signal is received.

As will become apparent from the discussion below, the optimal implementation of control unit 18 varies based upon the characteristics and constraints of digital system 10 and the information available to control unit 18. Hereafter, with respect to the embodiment shown in FIG. 1, it is assumed that bandwidth P and latency Q of packet transmission between buffer 14 and consumer 16 are unknown to control unit 18 and that control unit 18 has the following dynamic inputs:

(1) a producer output indication 22 (PROD_OUT), which is generated at each clock tick and indicates a number of packets output by producer 12 at that time. Producer output indication 22 is not visible to control unit 18 until W1 clock ticks have elapsed after it is generated; and (2) a buffer output indication 24 (BUFF_OUT), which is generated at each clock tick and indicates a number of packets output by buffer 14 at that time. Buffer output indication 24 is not visible to control unit 18 until W2 clock ticks have elapsed after it is generated.

In order to optimize implementation of control unit 18 given these assumptions, it is important to note that a feedback latency of Y+W1 clock ticks elapse between the time that control unit 18 decides to grant permission for producer 12 to send a given number of packets and the time when control unit 18 receives an producer output indication 22 indicating how many packets producer 12 chose to send. During this feedback latency interval, in order to avoid possible packet loss due to exceeding the known capacity G of buffer 14, control unit 18 must speculate that producer 12 has indeed chosen to send the maximum number of allowed packets whenever permission is granted. Conversely, to obtain optimal information flow, control unit 18 must track all grants of permission that are not utilized by producer 12 in order to correct for mis-speculation.

Accordingly, control unit 18 maintains, in a grant counter 26, a grant count (GRANT_COUNT) of the total number of packets control unit 18 has allowed (i.e., the sum of the values in grant signals) over the previous Y+W1 clock ticks. In addition, control unit 18 maintains, in a buffer counter 28, a buffer count (BUFF_COUNT) indicating the number of packets control unit 18 is currently aware of in buffer 14.

Based upon the dynamic producer and buffer output indications and the buffer count and grant count calculated by control logic 18, the following set of equations describes the preferred behavior of control unit 18.

GRANT/HOLD=non-negative min. (J, (G−(GRANT_COUNT+BUFF_COUNT+PROD_OUT−BUFF_OUT)));

BUFF_COUNT_NEW=BUFF_COUNT_OLD+PROD_OUT−BUFF_OUT; and

GRANT_COUNT_NEW=sum of the granted bandwidth over the previous Y+W1 clock ticks.

In other words, control unit 18 issues a grant or hold signal indicating a number of packets that producer 12 may output, where the indicated number is the lesser of the maximum bandwidth J and the difference between the buffer capacity G and the sum of the grant count, the buffer count, and the producer output indication less the buffer output indication. In addition, control unit 18 updates the grant count and the buffer count, where the updated grant count is equal to the sum of the granted bandwidth over the previous Y+W1 clock cycles and the updated buffer count is equal to the old buffer count plus the difference between the producer output indications and the buffer output indications. Those skilled in the art will appreciated that equivalent expressions of these relationships may also be derived.

The regulation of packet flow by control unit 18 can be improved if attributes of consumer 16 are known to control unit 18 and factored into the generation of the grant/hold signal. For example, referring now to FIG. 2, there is illustrated a second exemplary embodiment of a high frequency digital system 30 in which the control of information flow between a producer 12 and consumer 16 via an intermediate buffer 14 is improved by incorporating packet flow information pertaining to consumer 16 into the control unit 32. In the embodiment shown in FIG. 2, control unit 32 is aware that consumer 16 has a finite buffer capacity G2, is aware of buffer-to-consumer bandwidth P and latency Q, and receives as a dynamic input a consumer output indication 34 (CON_OUT) indicating a number of packets output from the buffer of consumer 16, subject to a latency W3.

Given this additional information, control unit 32 still speculates that producer 12 has chosen to output the maximum number of allowed packets whenever permission is granted and tracks all unutilized grants of permission to correct mis-speculation, as described above. However, given the additional information pertaining to consumer 16, control unit 32 can take into account the fact that some minimum number of packets G3 are guaranteed to be transferred from buffer 14 to consumer 16 during any arbitrary period of Y+K clock ticks, provided that the buffer of consumer 16 has enough excess capacity to indicate to a control unit 36 that regulates output of packets from buffer 14 that buffer 14 may send those packets to consumer 16. Assuming buffer 14 is implemented as a traditional buffer that can output a packet that was received the cycle before, G3 can be expressed as (Y+K)/P. To account for the additional information, control unit 32 maintains, in addition to buffer counter 28 and a grant counter 26, a consumer counter 38 indicating a consumer count of the number of packets control unit 32 is currently aware of in the buffer of consumer 16.

Given the above inputs and assumptions, the information flow control implemented by control unit 32 can be described by the following equations:

GRANT/HOLD=non-negative min. (J, ((G+G3)−(GRANT_COUNT+BUFF_COUNT+PROD_OUT−BUFF_OUT)), ((G+G2)−(GRANT_COUNT+BUFF_COUNT+CON_COUNT+PROD_OUT−CON_OUT)));

BUFF_COUNT_NEW=BUFF_COUNT_OLD+PROD_OUT−BUFF_OUT;

GRANT_COUNT_NEW=sum of the granted bandwidth over the previous Y+W1 clock ticks; and

CON_COUNT_NEW=CON_COUNT_OLD+BUFF_OUT−CON_OUT;

where CON_COUNT is the consumer count within consumer counter 38 and CON_OUT is the number of packets dynamically indicated in consumer output indication 34.

Figure 2:
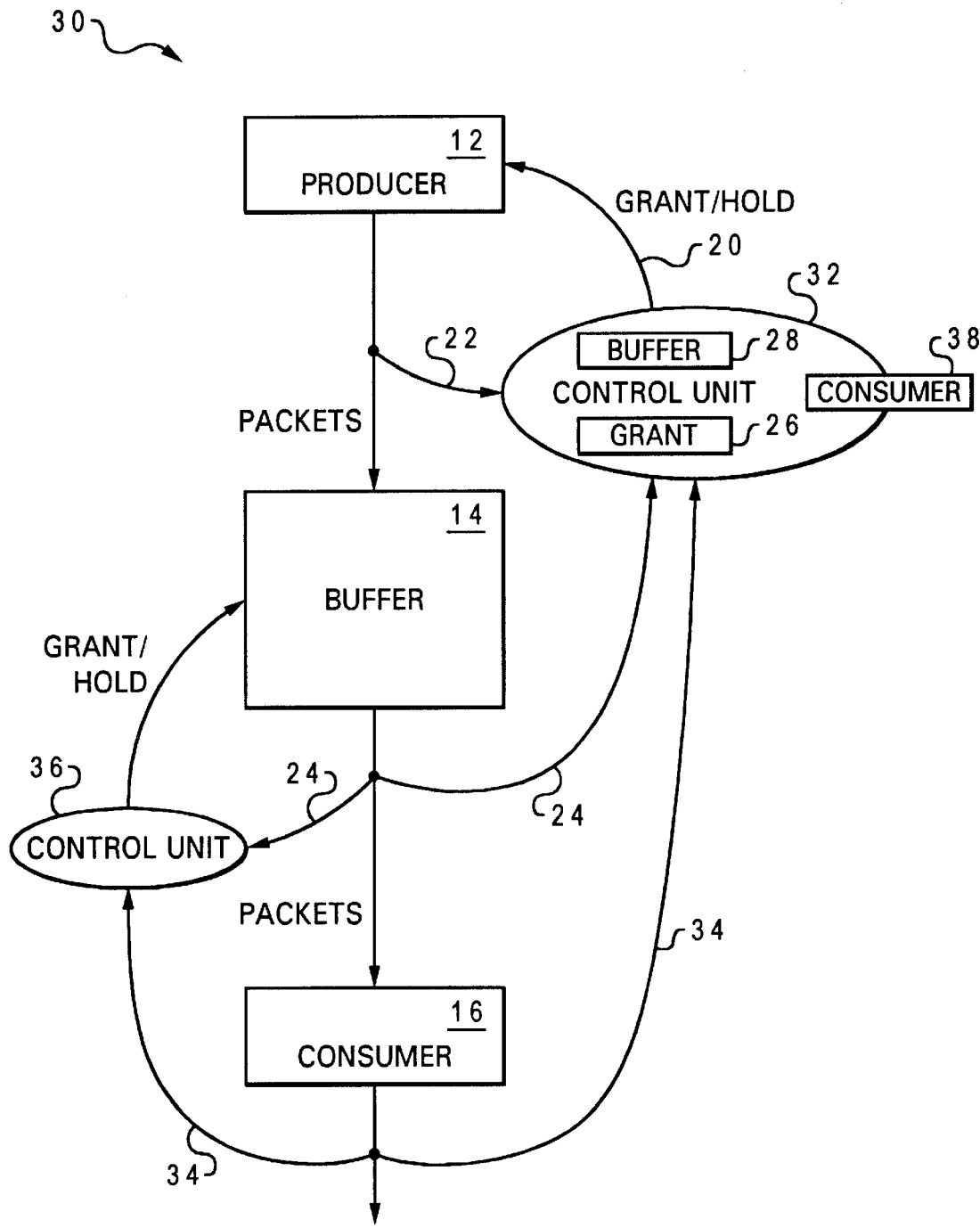
FIG. 2 illustrates a block diagram of a second exemplary embodiment of a high frequency digital system in which information flow between a producer and a buffering consumer via an intermediate buffer is efficiently controlled in accordance with the present invention.

In summary, FIG. 2 and the associated descriptions illustrate how control unit 32 manages the flow of information between a producer 12 and a buffer 14, based not only upon flow rate and capacity information from that buffer 14, but also based upon flow rate and capacity information from that buffer's successor buffer 16. It is possible to extend this approach to multiple cascaded buffers, with the control unit managing the flow of information between any two adjacent buffers making advantageous use of flow rate and capacity information from multiple downstream buffers.

For example, the system described in detail above may be characterized as a series of a producer followed by two cascaded buffers, where producer 12 is called B[0], buffer 14 is called B[1], and consumer buffer 16 is called B[2]. The data path between producer 12 and buffer 14 is called P[0,1], and the data path between buffer 14 and consumer buffer 16 is called P[1,2]. Control unit 32 is called U[0,1], and control unit 36 is called U[1,2]. The capacity of buffer 14 (G) is called C[1], and the capacity of consumer buffer 16 (G2) is called C[2]. The guaranteed flow rate (G3) from buffer 14 to consumer buffer 16 over a span of (Y+K) clock ticks is called R[1,2]. The PROD_OUT indication is called F[0,1], the BUFF_OUT indication is called F[1,2], is and the CON_OUT indication is called F[2,3].

Using these definitions, the GRANT/HOLD equation for U[0,1] may be characterized as utilizing knowledge of downstream constant quantities C[1], C[2], and R[1,2] and downstream dynamic inputs F[0,1], F[1,2], and F[2,3] to control the flow of information between B[0] and B[1]. Likewise, for an arbitrary sequence of cascaded buffers (B[0] . . . B[n]), any GRANT/HOLD equation for an arbitrary U[i,i+1] will potentially benefit from knowledge of all downstream constant quantities (C[i+1] . . . C[k]) and (R[i+1, i+2] . . . R[k−1, k]) and all downstream dynamic inputs (F[i, i+1] . . . F[k, k+1]) for which k is less than or equal to n, where k indicates the first buffer (B[k]) in the sequence for which (R[k, k+1]) is equal to zero.

Figure 3:
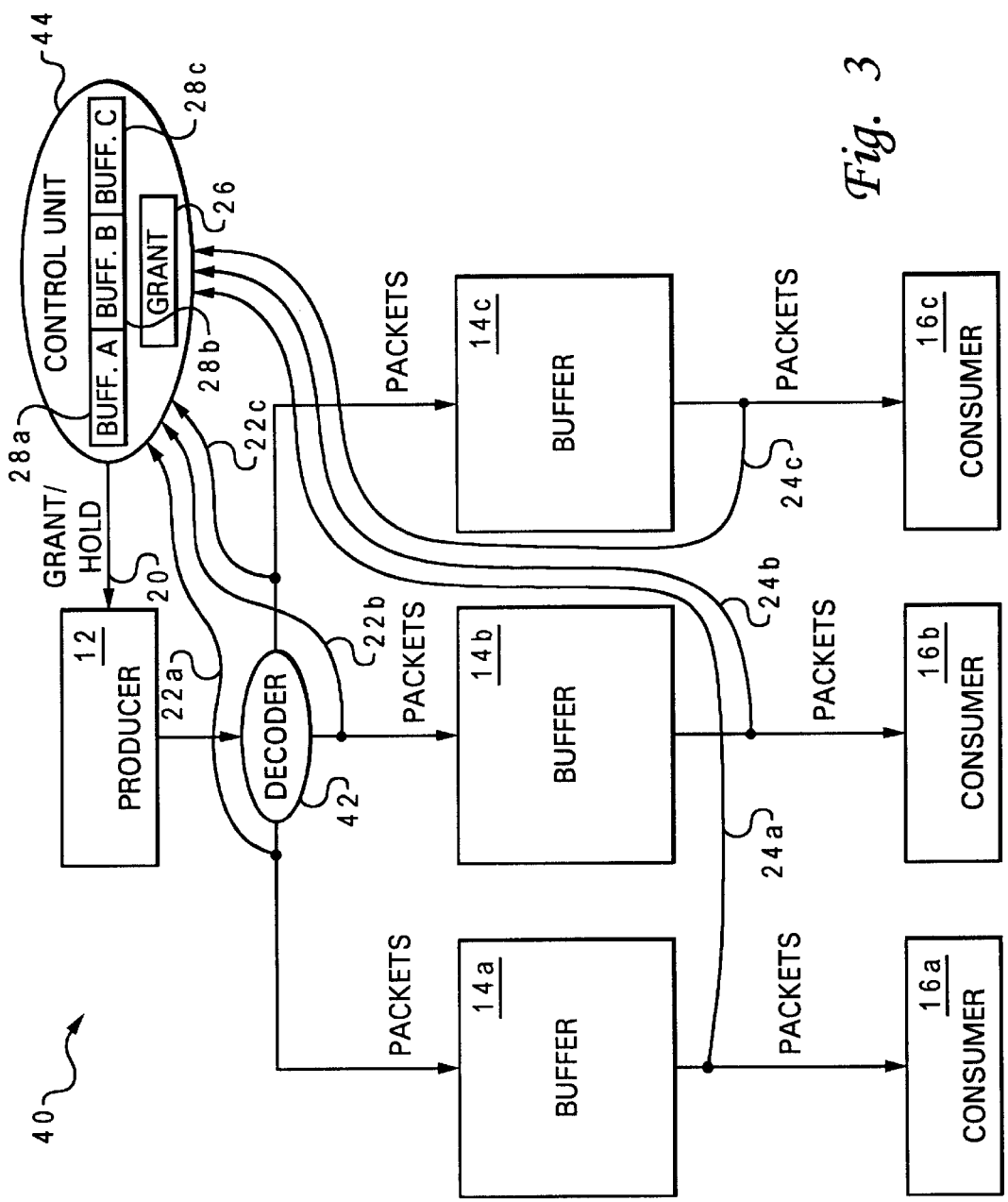
FIG. 3 depicts a block diagram of a third exemplary embodiment of a high frequency digital system in which information flow between a producer and multiple consumers via multiple buffers is efficiently controlled in accordance with the present invention.

With reference now to FIG. 3, there is depicted a block diagram of a third exemplary embodiment of a high frequency digital system 40 in which information flow between a producer and multiple consumers via multiple buffers is efficiently controlled in accordance with the present invention. As indicated by like reference numerals, digital system 40 contains similar components to digital system 10 of FIG. 1. However, instead of a single buffer 14 and a single consumer 16, digital system 40 contains multiple buffers 14a–14c, which are coupled to a single producer 12 by a decoder 42, and multiple consumers 16a–16c, which are each coupled to a respective one of buffers 14a–14c. Decoder 42 utilizes routing information included in each packet of information (e.g., an address) to determine which one of buffers 14a–14c is the intermediate destination of the packet. The flow of information from producer 12 to consumers 16a–16b is regulated by a control unit 44.

For the embodiment depicted in FIG. 3, it is again assumed that producer 12 is memoryless and that bandwidth P and latency Q of buffer-to-consumer packet flow are unknown to control unit 44. As illustrated, control unit 44 receives as inputs a separate producer output indication 22 and a separate buffer output indication 24, as described above, for each of the three information flow paths. The characteristic latencies of these signals are independent and may vary between information flow paths (e.g., W1[a] may not be the same as W1[b]). Because digital system 40 contains only a single producer 12, control unit 44 outputs, via grant/hold signal line 20, only one grant/hold signal indicating a number of packets producer 12 may output during each cycle.

Assuming control logic 44 remains subject to the Y+W1[i] feedback latency discussed above for each of the three possible information flow paths, control logic 44 assumes that producer 12 has chosen to send the maximum number of allowed packets whenever permission is granted in order to avoid possible packet loss due to exceeding the capacity (G[a], G[b], G[c]) of any buffer 14. Control unit 44 also speculates that the packets will be routed to the buffer 14 that is currently the most highly utilized of all of buffers 14a–14c. To yield optimal results, control unit 44 tracks all grants of permission that are not utilized so that mis-speculation can be corrected. Accordingly, control unit 44 maintains, in a grant counter 26, a grant count as discussed above, where the feedback latency over which the grant count is accumulated is the largest over all information flow paths (i.e., the maximum Y+W1[i]). In addition, control unit 44 maintains a separate buffer count, as discussed above, for each of buffers 14a–14c utilizing buffer counters 28a–28c, respectively.

Given the dynamic producer and buffer output indications and the buffer counts and grant count calculated by control logic 18, the following set of equations describes the preferred behavior of control unit 44 of FIG. 3:

GRANT/HOLD=non-negative min. (the lesser of (G[i]−(GRANT_COUNT+BUFF_COUNT[i]+PROD_OUT[i]−BUFF_OUT[i])) and J) across all information flow paths i;

BUFF_COUNT_NEW[i]=BUFF_COUNT_OLD[i]+ PROD_OUT[i]–BUFF_OUT[i] for each information flow path i; and GRANT_COUNT_NEW=sum of the granted bandwidth over the previous (max. (Y+W1[i])) clock ticks. Because the above equations depend upon worst case latencies and buffer capacities, optimizations to the design of digital system 40 can be made by optimizing (centralizing) the location of control unit 44 and/or selectively increasing certain buffer capacities G[i] to compensate for long associated latencies W1[i] in the same information flow path.

Figure 4:
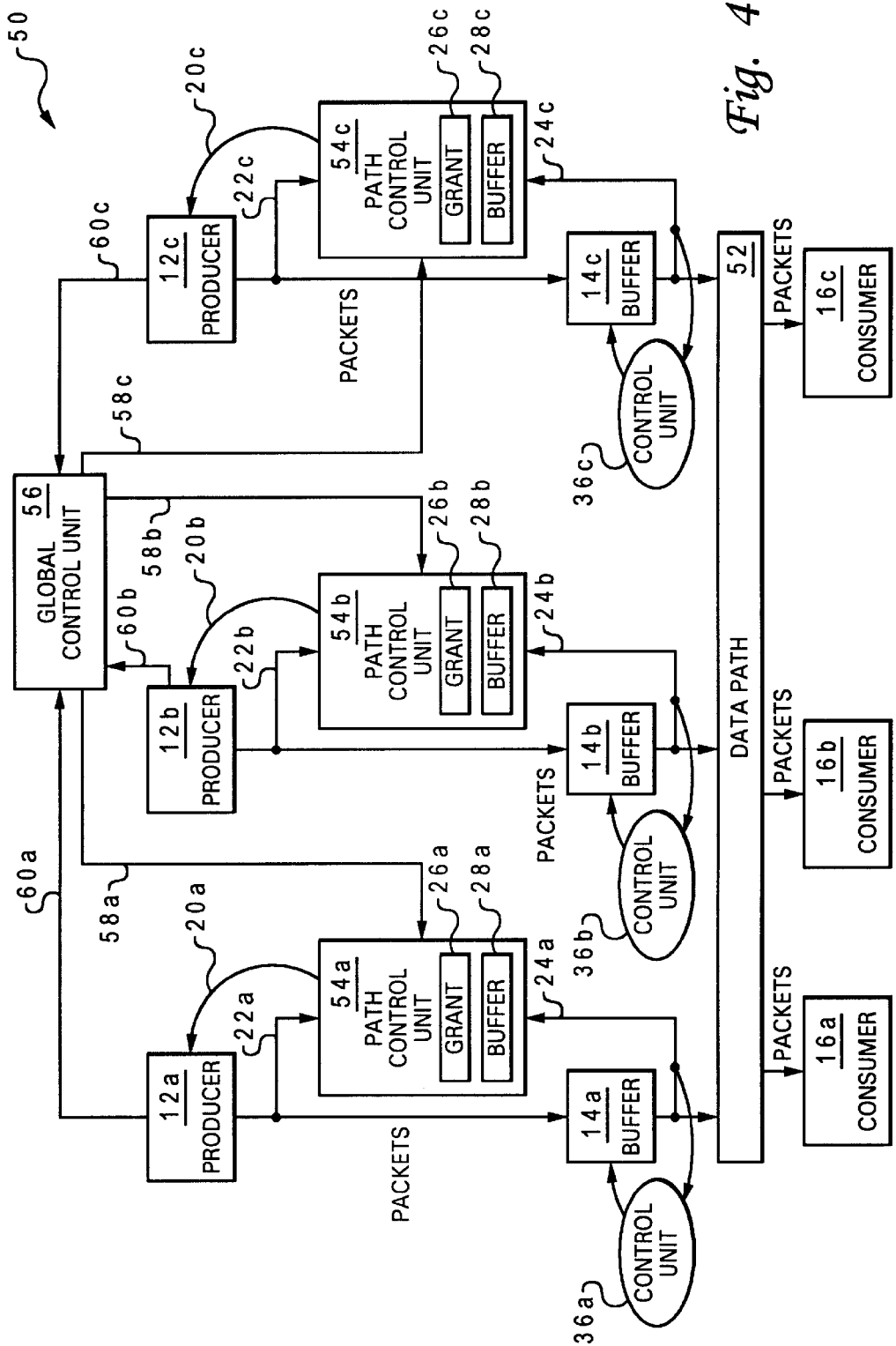
FIG. 4 illustrates a block diagram of a fourth exemplary embodiment of a high frequency digital system in which information flow between multiple producers and multiple consumers via multiple buffers and a shared data path is efficiently controlled in accordance with the present invention.

Referring now to FIG. 4, there is illustrated a block diagram of a fourth exemplary embodiment of a high frequency digital system in which information flow between multiple producers and multiple consumers via multiple buffers and a shared buffer-to-consumer data path is efficiently controlled in accordance with the present invention. Digital system 50 includes a number of memoriless producers 12a–12c that each transfer packets of information to a respective one of buffers 14a–14c under the control of a respective path control unit 54a–54c. As discussed above, packet transfer from producers 12a–12c to buffers 14a–14c is subject to a per clock tick bandwidth constraint J[i] and a latency constraint K[i], and buffers 14a–14c have respective maximum capacities G[a], G[b], and G[c]. Packets are then transferred from buffers 14a–14c to respective consumers 16a–16c via shared data path 52, subject to an aggregate per clock tick bandwidth constraint P for data path 52 and a latency constraint Q. The transfer of packets from each buffer 14 to the respective consumer 16 is managed by an associated control unit 36. For simplicity, it is assumed that the capacity of consumers 16 is infinite; however, as described below with respect to FIG. 6, a finite consumer buffering capacity G2 can be factored into the flow control equations.

Viewed in isolation, each information path i comprising a producer 12[i], buffer 14[i] and consumer 16[i] may be seen as an instance of digital system 30 described above with respect to FIG. 2. However, the guaranteed buffer-to-consumer packet flow G3[i] of each information path i is reduced by a factor of I in the worst case since I information paths share the bandwidth P of data path 52. To improve upon this worst case, the present invention utilizes knowledge of the activity of producers 12a–12c to increase the G3[i] of active producers 12 during any period in which other producers 12 are relatively inactive.

As shown in FIG. 4, the packet flow control functionality is implemented by per-path path control units 54a–54c and a global control unit 56. As will be appreciated by those skilled in the art, global control unit 56 may be implemented as a single centralized logic block or distributed as multiple interconnected logic blocks near or in path control units 54 or producers 12 or as a combination of centralized and distributed logic.

Global control unit 56 receives as inputs producer ready indications 60a–60c, which each indicate (subject to a latency W5[i]) if the associated producer 12 has or will soon have a packet ready to be sent, and utilizes these inputs to generate global utilization signals 58a–58c, which each indicate the total number of active producers 12 (ACTIVE_PROD) and a GLOB_UTIL_GRANT that specifies whether the associated path control unit 54 is authorized to output a grant signal on its grant/hold signal line 20. Global utilization signals 58a–58c, which are each subject to a respective latency W4[i], may or may not change between clock ticks, depending on the dynamic values of producer ready indications 60a–60c.

Each path control unit 54 receives as inputs a respective producer output indication 22 (subject to latency W1[i]) and a buffer output indication 24 (subject to latency W2[i]), as discussed above. In addition, each path control unit 54 also receives from global control unit 56 a respective global utilization signal 58. As above, the interval between the output of the grant/hold signal by path control unit 54 and the reaction to that output by the associated producer 12 is described by a respective latency Y[i]. A path control unit 54 can allow its producer 12 to send packets only when the associated global utilization signal 58 contains a GLOB_UTIL_GRANT authorizing the issuance of a grant signal via grant/hold signal line 20. Thus, if a producer 12 deasserts its ready indication 60, the flow of grants received from its path control unit 54 will cease. Upon reasserting ready indication 60, the producer 12 will experience a possibly sizable latency penalty of W4[i]+W5[i]+Y[i] before a subsequent grant is received. If the grant/hold signal indicates a hold (i.e., zero packets are authorized for transmission), the producer 12 is not allowed to send any packets at the current clock tick. If the number of packets indicated in the grant/hold signal is between one and J[i], the producer 12 is allowed, but not required, to send up to the indicated number of packets.

To optimize packet flow during the Y[i]+W1[i] feedback control interval, each path control unit 54 maintains a respective grant count (GRANT_COUNT) in a grant counter 26 and buffer count (BUFF_COUNT) in a buffer counter 28, as described above. In addition, to maximize its portion of buffer-to consumer bandwidth P, each path control unit 54 makes use of the number of active producers (ACTIVE_PROD) indicated in its global utilization indication 58. For example, in the illustrated embodiment, if the bandwidth of any information flow path is assumed to be inversely proportional to the number of producers 12, then a path control unit 54 knows that its buffer 14 will have a worst case (i.e., guaranteed) drain rate of one packet every 3 clock ticks if all three of producers 12a–12c are active. However, if the behavior of producers 12a–12c is characterized by bursts of activity punctuated by long periods of inactivity, global control unit 56 can dynamically react to this behavior by removing GLOB_UTIL_GRANT to the path control units 54 of relatively inactive producers 12, thus allowing other producers 12 which encounter bursts of activity to enjoy increased bandwidth.

The following set of equations describes the preferred functional behavior of each path control logic 54 for the embodiment shown in FIG. 4:

if (GLOB_UTIL_GRANT) {
  G3[i] =f(ACTIVE_PROD);
  GRANT/HOLD=non-negative min. (J[i], (G[i]+G3[i]–(GRANT_COUNT[i]+BUFF_COUNT[i]+PROD_OUT[i]–BUFF_OUT[i])));
}else {
  GRANT/HOLD=0;
}

BUFF_COUNT[i]_NEW=BUFF_COUNT[i]_OLD+ PROD_OUT[i]–
BUFF_OUT[i]; and
GRANT_COUNT[i]_NEW=sum of the granted bandwidth for producer i over the previous (max. (Y[i]+W1[i])) clock ticks;
where f(m) is a function appropriate to the structure of buffers 14 and the behavior of control units 36. In a preferred embodiment in which buffers 14 are traditional buffers capable of outputting packets in the cycle following receipt and control units 36 share bandwidth P in a round-robin fashion, f(m)=P×(Y[i]+K[i])/ACTIVE_PROD).

The benefits of the adaptive control functionality provided by global control unit 56 and path control units 54a–54c are especially apparent when one producer 12 is sending a large number of packets and others of producers 12a–12c are relatively inactive. In such operating scenarios, global control logic 56 reacts to the relative inactivity of certain of producers 12a–12c evidenced by producer ready indications 60 by disabling the grant authority of the path control unit(s) 54 of the inactive producer(s) 12. In response to the change in number of active producers 12 indicated by the global utilization indication 58, the path control unit 54 of each remaining active producer 12 reacts by recalculating its available bandwidth, thus increasing the grant indications to the active producers 12.

The dynamic control scenario discussed above can be reduced to a simpler control scenario if the number and identity of active producers 12 is statically or dynamically controlled by the contents of a configuration register or the like. In this simpler embodiment, producer ready indications 60 are unnecessary or simply indicate that the producer is enabled or disabled. Global utilization inputs 58 merely indicate the number of active producers 12 permitted by the present configuration. In other words, global control unit 56 may be implemented by a very simple structure, such as a configuration register. As before, the guaranteed flow of packets G3[i] can be determined according to the number of active producers 12.

Figure 5:
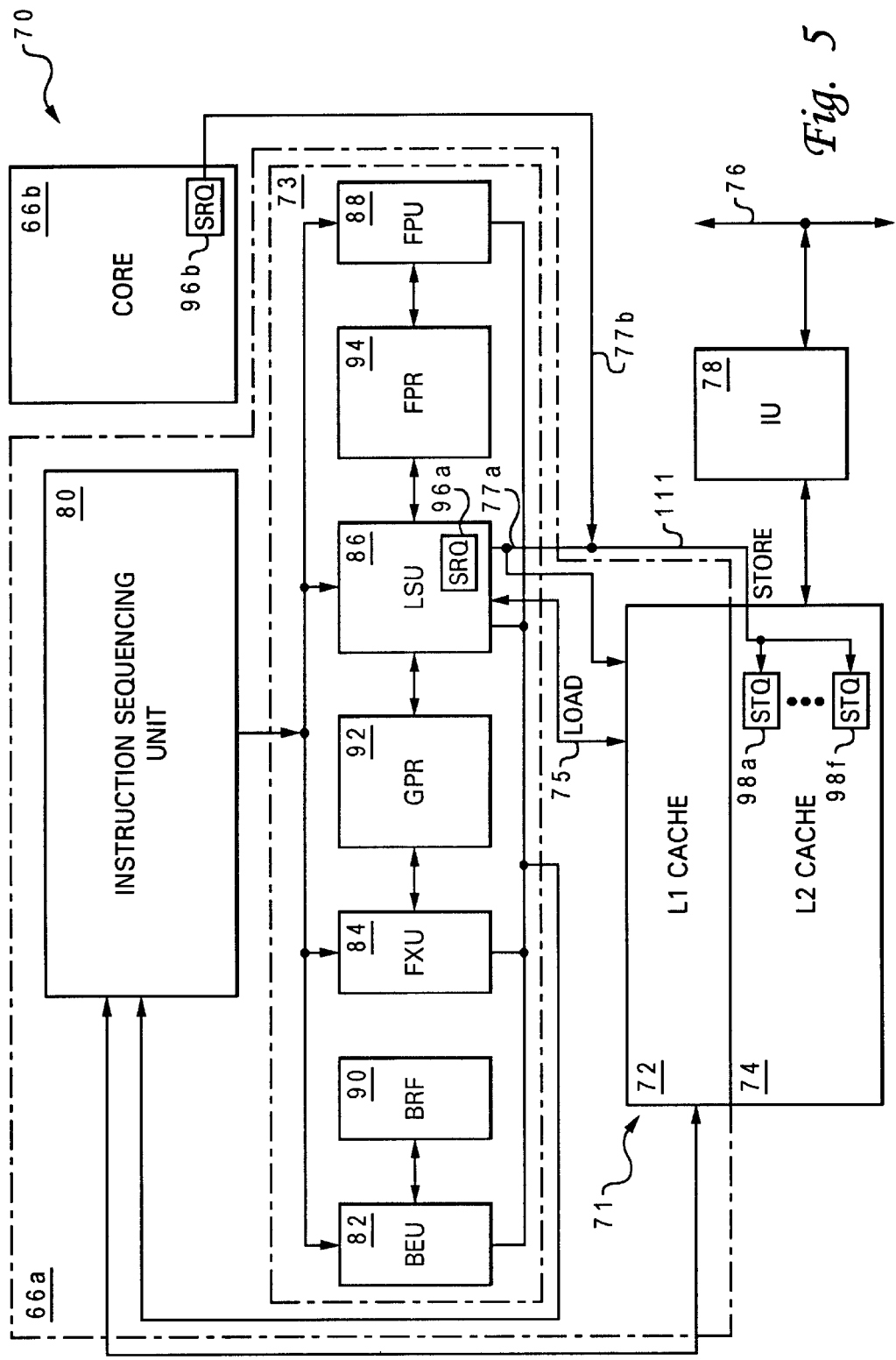
FIG. 5 is a high level block diagram of an illustrative embodiment of a processor in which information flow between two queues is controlled in accordance with the present invention.

Heretofore, numerous embodiments of digital systems have been described in order to demonstrate the general applicability of the principles of the present invention to various digital system topologies. With reference now to FIG. 5, there is illustrated a high level block diagram of an exemplary embodiment of a particular digital system, namely, a microprocessor, to which the general principles hereinbefore described may advantageously be applied. As illustrated, processor 70, which is preferably implemented as a single chip integrated circuit, comprises two processor cores 66a and 66b, a store-through cache hierarchy 71, and an interface unit (IU) 78.

IU 78 provides an external interface through which processor 70 can be coupled to other devices, for example, via interconnect 76. Within processor 70, IU 78 is coupled to store-through cache hierarchy 71, which in the illustrated embodiment comprises an L1 cache 72 in each of processor cores 66a–66b and a L2 cache 74 shared by processor cores 66a and 66b. Store-through cache hierarchy 71 provides low latency storage for instructions and data likely to be utilized by processor cores 66a and 66b during instruction execution. Store-through cache hierarchy 71 supplies requested data to processor cores 66a–66b via one or more load pipelines 75 and receives store requests from processor cores 66a–66b via two store pipelines 77a–77b that share routing logic 111. As a store-through cache hierarchy, all store requests cause data to be written into both the local L1 cache 72 and shared L2 cache 74 so that strong inclusivity is maintained. To maximize access bandwidth, L2 cache 74 is implemented with three slices (banks) having separate read and write ports.

Each processor core 66 includes execution resources 73 and an instruction sequencing unit 80, connected to cache hierarchy 71, which fetches instructions from cache hierarchy 71 and which controls the flow of instruction execution. Branch instructions fetched from cache hierarchy 71 are processed by instruction sequencing unit 80 to generate (possibly speculative) fetch addresses utilized to request additional instructions from cache hierarchy 71. The branch instructions, together with other non-branch instructions including fixed-point, load/store, and floating-point instructions, are then dispatched to the execution units of the processor core 66 for execution as execution resources 73 become available.

As shown, the execution units in each of processor cores 66a–66b include a branch execution unit (BEU) 82, a fixed-point unit 84, a load-store unit (LSU) 86, and a floating-point unit (FPU) 88, which can each execute one or more classes of instructions. Instructions can be executed concurrently and opportunistically by the execution units in any order as long as data dependencies and antidependencies are observed. As shown, BEU 82, FXU 84 and FPU 88 each have a respective register file, namely, branch register file (BRF) 90, general-purpose register (GPR) file 92, and floating-point register (FPR) file 94, from which instruction operands can be obtained and into which result data can be stored. Data are transferred between register files 92 and 94 and cache hierarchy 71 by LSU 86 in response to execution of load and store instructions.

After one of execution units 82, 84, 86 and 88 has finished executing an instruction, the execution unit typically stores result data, if any, in a rename register in its respective register file and notifies a completion table within instruction sequencing unit 80. If the instruction is a conditional branch instruction, the result of execution, namely, the branch target address, is supplied to instruction sequencing unit 80 to redirect fetching in the event that the branch was mispredicted. After the completion table is notified that execution has finished, the completion table directs the remapping of the rename register(s) containing the result data of the finished instruction, if any, into one or more architected registers.

Figure 6:
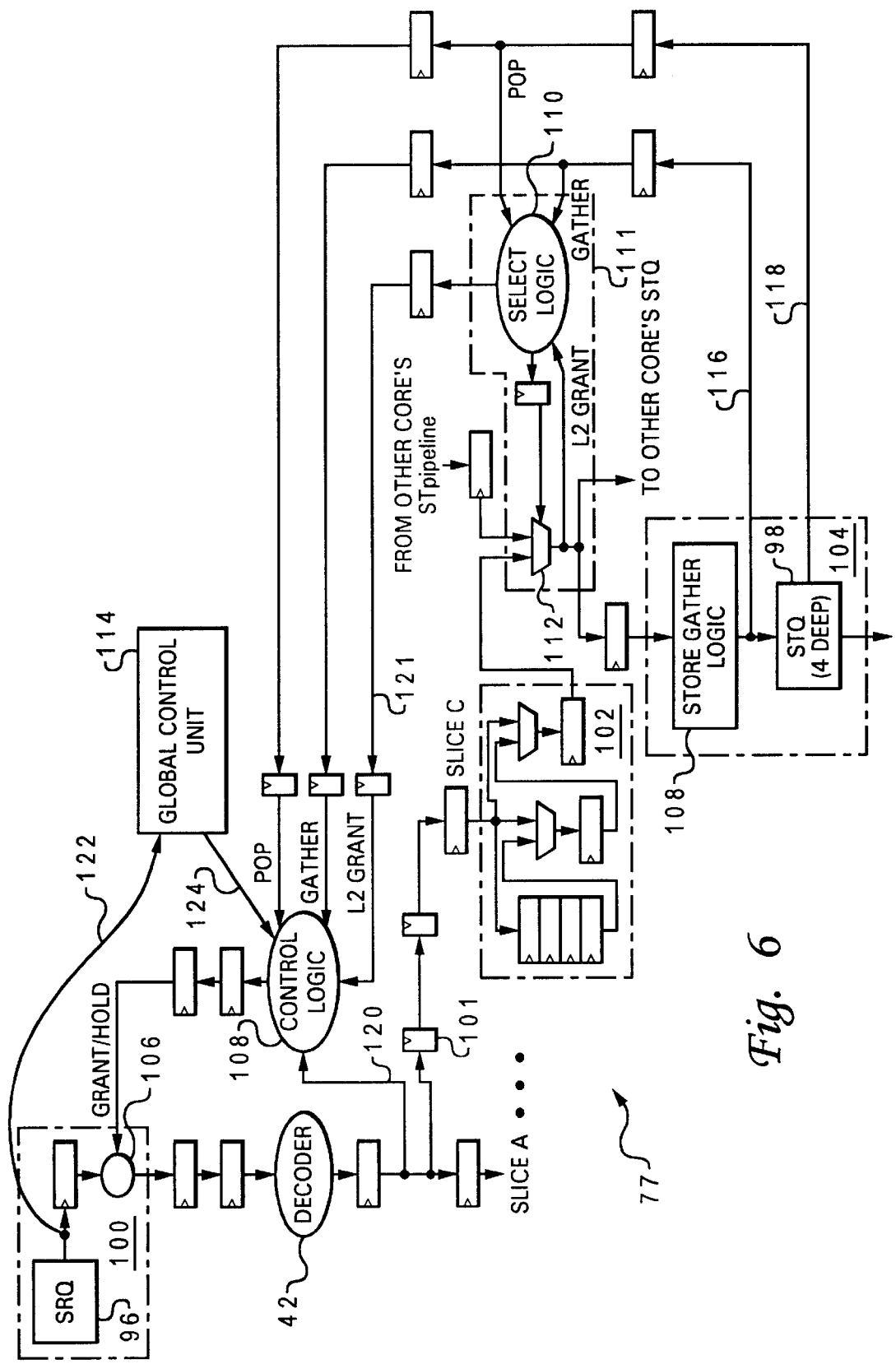
FIG. 6 is a more detailed block diagram of the information flow between the two queues of the processor shown in FIG. 5.

In accordance with the present invention, the flow of store requests from a store reorder queue (SRQ) 96 within the LSU 86 of each processor core 66 to a number of store queues (STQs) 98a–98f within L2 cache 74 can be optimized to satisfy the frequency constraints of the high frequency design of processor 70. Referring now to FIG. 6, there is depicted a more detailed view of a store pipeline 77 linking an SRQ 96 and STQs 98. As shown, each store pipeline 77 comprises a series of latches 101 that link a producer 100, which includes an SRQ 96 and send logic 106, with a respective set of three consumers 104, which each include store gather logic 108 and a STQ 98, via three intermediate buffers 102. The transfer of store operations between producers 100 and consumers 104 via store pipelines 77 is regulated by two instances of control logic 108 (i.e., one for each store pipeline 77) and a global control unit 114.

As illustrated, each producer 100, which has a bandwidth of one 1-to-8 byte store request per cycle, outputs store requests to a respective decoder 42. Decoder 42 determines by reference to the store address associated with each store request the appropriate slice of L2 cache 74 to service the store request and then routes the store request accordingly. Thus, from decoder 42, store requests flow into one of three buffers 102 (only one of which is illustrated) in between decoder 42 and consumers 104. The latency from SRQ 96 to buffer 102 (i.e., latency K) varies between slices in the depicted embodiment from 4 cycles for slice A to 6 cycles for slice C.

As depicted in FIG. 6, each buffer 102 contains six latches 101 and therefore has a maximum capacity G of six store requests. From a buffer 102, store requests are presented to shared routing logic 111, which comprises a multiplexer 112 and select logic 110 for each respective one of the three slices of L2 cache 74. (FIG. 6 illustrates the routing logic 111 associated with only one of the three slices of L2 cache 74.) If both processor cores 66 are producing store requests directed to a particular slice, the effective output bandwidth of a particular buffer 102 associated with that slice is one request every two cycles because only one of two pending store requests from the two buffers 102 associated with that particular slice of L2 cache 74 can be selected by select logic 110 in a particular clock cycle.

Once selected as an output of multiplexer 112 by select logic 110, a store request is routed to one of the two consumers 104 for that slice of L2 cache 74 according to which processor core 66 contains the producer 100 of that store request (i.e., there are six consumers 104, two for of each of the three slices of L2 cache 74, with each producer 100 having one associated consumer 104 for each slice). Store requests received by a consumer 104 are gathered with other store requests targeting adjacent addresses by store gather logic 108 in order to maximize the utilization of the four buffer entries within STQ 98. A gather signal 116 is asserted by consumer 104 when a store request is successfully gathered, and a pop signal 118 is asserted when a store request has been serviced (i.e., written into L2 cache 74) and removed from STQ 98. Thus, in the depicted embodiment, a POP_GTHR value of 0 is received by control logic 108 when pop signal 118 and gather signal 116 are deasserted, a POP_GTHR value of 1 is received by control logic 108 when either pop signal 118 or gather signal 116 is asserted and the other is deasserted, and a POP_GTHR value of 2 is received by control logic 108 when both pop signal 118 and gather signal 116 are asserted. Pop signal 118 and gather signal 116 are subject to latencies W3A and W3B, respectively.

Although any of the four control schemes discussed above (or other variations required or suggested by different design constraints) could be employed to regulate information flow via store pipeline 77, in the depicted embodiment control logic 108 and global control unit 114 preferably implement the control scheme described above with reference to FIG. 4, given the presence of two producers 100 (i.e., one SRQ 96 in each processor core 66), three consumers 104 for each producer 100, and shared routing logic 111.

Global control unit 114 can be implemented in several ways. In a preferred embodiment, global control unit 114 dynamically detects on a cycle-by-cycle basis if each producer 100 is quiescent (i.e., infrequently producing store requests) by detecting if each producer 100 has provided a producer ready indication 122 within a threshold number of cycles. If a producer 100 has been quiescent for the threshold number of cycles, then global control logic 114 determines that the producer 100 is inactive and, within global utilization indication 124, deasserts the GLOBAL_UTIL_GRANT to the inactive producer 100 and decrements the number of active producers 100 (i.e., to 1) indicated in global utilization indication 124. Global control unit 114 maintains fairness by restoring the GLOBAL_UTIL_GRANT to the relatively quiescent producer 100 upon receipt of a producer ready indication 122.

The benefits of dynamic management of which producers are active are particularly apparent when one processor core 66 requests to burst-store a lot of data and the other processor core is quiet or disabled. As described above, the dynamic control scheme implemented by control logic 108 can be simplified to a static control scheme in which a global control unit 114 provides control logic 108 with a configuration signal indicating whether the other processor core 66 is enabled. Control logic 108 can utilize this information to calculate an increased guaranteed flow rate G3 when the other processor core 66 is disabled.

In deriving exemplary control equations for each control logic 108, the following constraints are assumed:

(1) latency Y, which describes the interval between generation of a GRANT/HOLD signal by control logic 108 and receipt of that GRANT/HOLD signal by send logic 106 of producer 100 is two cycles;
(2) latency W1 between output of a store request by a producer 100 and receipt of a producer output indication 120 at control logic 108 is three cycles;
(3) capacity G of each buffer 102 is equal to six;
(4) J, the output bandwidth of each producer 100 is 1 packet per cycle;
(5) latency K between the output of a store request by a producer 100 and receipt of that store request by a buffer 102 is four cycles for slice A, five cycles for slice B, and six cycles for slice C; however, because consistent equations are desirable for all slices, a worst case of four cycles is assumed;
(6) buffer-to-consumer bandwidth P is 1 packet per cycle, but is shared by two producers 100, yielding a guaranteed flow rate of one packet every two cycles for each producer 100;
(7) given P=1, Y+K=6, the illustrated structure of buffer 102, and a round-robin select logic 110, G3=P×(Y+K)/ACTIVE_PROD=1×6/2=3 packets when both producers 100 are active; and
(8) capacity G2 of each STQ 98 is equal to four.

While the other latencies W2, W3A, W3B and Q affect the performance of information flow, these quantities do not contribute to the information flow control equations.

Each control logic 108 includes a counter set that maintains the following quantities:

(1) a buffer count (BUFF_COUNT) for each buffer 102 equal to the number of producer output indications 120 for that information flow path minus the number of L2 grants 121 (i.e., buffer output indications);
(2) a grant count (GRANT_COUNT) of the number of GRANT signals in the previous five (i.e., Y+W1) cycles; and
(3) a consumer count (CON_COUNT) for each respective one of the three consumers 104, where the consumer count indicates, subject to latencies W2, W3A, and W3B, the number of packets within STQ 98, which is computed as the buffer output indications 121 (PROD_OUT) for that information flow path minus the number of gather signals 116 and pop signals 118 (i.e., minus POP_GTHR).

Given the above constraints and quantities, high level equations specific to the present detailed embodiment can be expressed as described below. It should be noted that at any given clock tick, the equations are evaluated in the order listed below.

EQUATION SPECIFIC TO CORE 0:
G3=P×(Y+K)/ACTIVE_PROD;

EQUATIONS SPECIFIC TO CORE 0, SLICE A:
GRANT[0A]=min. (J, ((G+G3)−(GRANT_COUNT[0]+BUFF_COUNT[0A]+PROD_OUT[0A]−BUFF_OUT[0A])), ((G+G2)−(GRANT_COUNT[0]+BUFF_

COUNT[0A]+CON_COUNT[0A]+PROD_OUT[0A]-CON_OUT[0A]]));

BUFF_COUNT[0A]_NEW=BUFF_COUNT[0A]_OLD+PROD_OUT[0A]-BUFF_OUT[0A];

CON_COUNT[0A]_NEW=CON_COUNT[0A]_OLD+BUFF_OUT[0A]-CON_OUT[0A];

EQUATIONS SPECIFIC TO CORE 0, SLICE B:
GRANT[0B]=min. (J, ((G+G3)-(GRANT_COUNT[0]+BUFF_COUNT[0B]+PROD_OUT[0B]-BUFF_OUT[0B])), ((G+G2)-GRANT_COUNT[0]+BUFF_COUNT[0B]+CON_COUNT[0B]+PROD_OUT[0B]-CON_OUT[0B]]));

BUFF_COUNT[0B]_NEW=BUFF_COUNT[0B]_OLD+PROD_OUT[0B]-BUFF_OUT[0B];

CON_COUNT[0B]_NEW=CON_COUNT[0B]_OLD+BUFF_OUT[0B]-CON_OUT[0B];

EQUATIONS SPECIFIC TO CORE 0, SLICE C:
GRANT[0C]=min. (J, ((G+G3)-(GRANT_COUNT[0]+BUFF_COUNT[0C]+PROD_OUT[0C]-BUFF_OUT[0C])), ((G+G2)-(GRANT_COUNT[0]+BUFF_COUNT[0C]+CON_COUNT[0C]+PROD_OUT[0C]-CON_OUT[0C]]));

BUFF_COUNT[0C]_NEW=BUFF_COUNT[0C]_OLD+PROD_OUT[0C]-BUFF_OUT[0C];

CON_COUNT[0C]_NEW=CON_COUNT[0C]_OLD+BUFF_OUT[0C]-CON_OUT[0C];

FURTHER EQUATIONS SPECIFIC TO CORE 0:
If (GLOB_UTIL_GRANT[0]) {
    GRANT/HOLD[0]=non-negative min. (GRANT[0A], GRANT[0B], GRANT[0C]);
} else {
    GRANT/HOLD[0]=0;
}

GRANT_COUNT[0]_NEW=sum of GRANT/HOLD over the previous (Y+W1) clock ticks;

The set of equations pertaining to processor core 0 which are set forth above, may be applied to processor core 1 by substituting 1 for 0 in all subscripts. The equations for core 0 are reduced below by substituting the constants defined earlier:

EQUATION SPECIFIC TO CORE 0:
G3=1×(2+4)/ACTIVE_PROD=6/ACTIVE_PROD;

EQUATIONS SPECIFIC TO CORE 0, SLICE A:
GRANT[0A]=min. (1, ((6+G3)-(GRANT_COUNT[0]+BUFF_COUNT[0A]+PROD_OUT[0A]-BUFF_OUT[0A])), ((6+4)-(GRANT_COUNT[0]+BUFF_COUNT[0A]+CON_COUNT[0A]+PROD_OUT[0A]-CON_OUT[0A]]));

BUFF_COUNT[0A]_NEW=BUFF_COUNT[0A]_OLD+PROD_OUT[0A]-BUFF_OUT[0A];

CON_COUNT[0A]_NEW=CON_COUNT[0A]_OLD+BUFF_OUT[0A]-CON_OUT[0A];

EQUATIONS SPECIFIC TO CORE 0, SLICE B:
GRANT[0B]=min. (1, ((6+G3)-(GRANT_COUNT[0]+BUFF_COUNT[0B]+PROD_OUT[0B]-BUFF_OUT[0B])), ((6+4)-(GRANT_COUNT[0]+BUFF_COUNT[0B]+CON_COUNT[0B]+PROD_OUT[0B]-CON_OUT[0B]]));

BUFF_COUNT[0B]_NEW=BUFF_COUNT[0B]_OLD+PROD_OUT[0B]-BUFF_OUT[0B];

CON_COUNT[0B]_NEW=CON_COUNT[0B]_OLD+BUFF_OUT[0B]—CON_OUT[0B];

EQUATIONS SPECIFIC TO CORE 0, SLICE C:
GRANT[0C]=min. (1, ((6+G3)-(GRANT_COUNT[0]+BUFF_COUNT[0C]+PROD_OUT[0C]-BUFF_OUT[0C])), ((6+4)-(GRANT_COUNT[0]+BUFF_COUNT[0C]+CON_COUNT[0C]+PROD_OUT[0C]-CON_OUT[0C]]));

BUFF_COUNT[0C]_NEW=BUFF_COUNT[0C]_OLD+PROD_OUT[0C]-BUFF_OUT[0C];

CON_COUNT[0C]_NEW=CON_COUNT[0C]_OLD+BUFF_OUT[0C]-CON_OUT[0C];

FURTHER EQUATIONS SPECIFIC TO CORE 0:
If (GLOB_UTIL_GRANT[0]) {
    GRANT/HOLD[0]=non-negative min. (GRANT[0A], GRANT[0B], GRANT[0C]);
} else {
    GRANT/HOLD[0]=0;
}

GRANT_COUNT[0]_NEW=sum of GRANT/HOLD over the previous (2+3) clock ticks;

Focussing on the GRANT[0A] equation, and recognizing that J and hence GRANT[0A], is a boolean quantity (i.e., zero or one), boolean logic operators are employed to re-frame the equation:

GRANT[0A]=min. (1, ((6+G3)-(GRANT_COUNT[0]+BUFF_COUNT[0A]+PROD_OUT[0A]-BUFF_OUT[0A])), ((6+4)-(GRANT_COUNT[0]+BUFF_COUNT[0A]+CON_COUNT[0A]+PROD_OUT[0A]-CON_OUT[0A]]));

GRANT[0A]=(1) AND ((6+G3)>(GRANT_COUNT[0]+BUFF_COUNT[0A]+PROD_OUT[0A]-BUFF_OUT[0A])) AND (10>(GRANT_COUNT[0]+BUFF_COUNT[0A]+CON_COUNT[0A]+PROD_OUT[0A]-CON_OUT[0A]));

GRANT[0A]=((6+G3)>(GRANT_COUNT[0]+BUFF_COUNT[0A]+PROD_OUT[0A]-BUFF_OUT[0A])) AND (10>(GRANT_COUNT[0]+BUFF_COUNT[0A]+PROD_OUT[0A]+CON_COUNT[0A]-CON_OUT[0A]));

Recognizing that any packet that exits the consumer buffer must first be present in the consumer buffer yields the immutable observation that CON_COUNT[0A]-CON_OUT[0A]≧0. Given this and the fact that the quantity (-BUFF_OUT[0A]) is always less than or equal to 0, it follows that:

CON_COUNT[0A]-CON_OUT[0A]>=-BUFF_OUT [0A];

(GRANT_COUNT[0]+BUFF_COUNT[0A]+PROD_OUT[0A]+CON_COUNT[0A]-CON_OUT[0A])>= (GRANT_COUNT[0]+BUFF_COUNT[0A]+PROD_OUT[0A]-BUFF_OUT[0A]);

So, if G3 is 4 or more, the term:

((6+G3)>(GRANT_COUNT[0]+BUFF_COUNT[0A]+PROD_OUT[0A]-BUFF_OUT[0A]))

will always be true whenever the following term is true:

(10>(GRANT_COUNT[0]+BUFF_COUNT[0A]+PROD_OUT[0A]+CON_COUNT[0A]-CON_OUT[0A])

Therefore, whenever G3 is 4 or more, the G3 term in the GRANT[0A] equation is irrelevant, and may be removed. Given that G3 is less than 4 only when ACTIVE_PROD is equal to 2, the equation which produces G3 may be discarded, and the G3 in the GRANT[0A] equation may be factored out, yielding the following reductions:

GRANT[0A]=((6+G3)>(GRANT_COUNT[0]+BUFF_COUNT[0A]+PROD_OUT[0A]-BUFF_OUT[0A])) AND (10>(GRANT_COUNT[0]+BUFF_COUNT[0A]+PROD_OUT[0A]+CON_COUNT[0A]-CON_OUT[0A]));

GRANT[0A]=((ACTIVE_PROD==2) AND ((6+3)>(GRANT_COUNT[0]+BUFF_COUNT[0A]+PROD_OUT[0A]-BUFF_OUT[0A])) AND (10>(GRANT_COUNT[0]+BUFF_COUNT[0A]+CON_COUNT[0A]+PROD_OUT[0A]-CON_OUT[0A]))) OR ((ACTIVE_PROD !=2) AND (10>(GRANT_COUNT[0]+BUFF_COUNT[0A]+CON_COUNT[0A]+PROD_OUT[0A]-CON_OUT[0A])));

GRANT[0A]=((ACTIVE_PROD==2) AND (9>(GRANT_COUNT[0]+BUFF_COUNT[0A]+PROD_OUT[0A]-BUFF_OUT[0A])) AND (10>(GRANT_COUNT[0]+BUFF_COUNT[0A]+CON_COUNT[0A]+PROD_OUT[0A]-CON_OUT[0A]))) OR ((ACTIVE_PROD !=2) AND (10>(GRANT_COUNT[0]+BUFF_COUNT[0A]+CON_COUNT[0A]+PROD_OUT[0A]-CON_OUT[0A])));

GRANT[0A]=((9>(GRANT_COUNT[0]+BUFF_COUNT[0A]+PROD_OUT[0A]-BUFF_OUT[0A])) OR (ACTIVE_PROD !=2)) AND (10>(GRANT_COUNT[0]+BUFF_COUNT[0A]+CON_COUNT[0A]+PROD_OUT[0A]-CON_OUT[0A]));

Replacing the term "ACTIVE_PROD !=2" with a new signal ACTIVE_PROD_NOT_TWO that is specifically suited to its use here yields:

GRANT[0A]=((9>(GRANT_COUNT[0]+BUFF_COUNT[0A]+PROD_OUT[0A]-BUFF_OUT[0A])) OR ACTIVE_PROD_NOT_TWO) AND (10>(GRANT_COUNT[0]+BUFF_COUNT[0A]+CON_COUNT[0A]+PROD_OUT[0A]-CON_OUT[0A]));

Focussing now on the underlying implementation of GRANT_COUNT[0] as the sum of GRANT/HOLD over the previous 5 clock ticks, a five element shift register can be utilized for each processor core 66 to track the grants from the previous 5 clock ticks. As a value is shifted into the shift register (from the GRANT/HOLD[0] signal), the signal is also saved in a latch called PREV_GRANT[0]. As a value is shifted out of the register (five clock ticks after the value was shifted in), the value is saved in a latch called GRANT_KNOWN[0]. Instead of accumulating these signals in GRANT_COUNT[0] and instead of using BUFF_COUNT [0A] to manage the known buffer capacity, a new, composite counter called BUFF_GRANT_COUNT[0A] is utilized to track both.

A new set of core 0 equations (once again omitting slice B and slice C, due to their structural equivalence with slice A) illustrates these changes:

EQUATIONS SPECIFIC TO CORE 0, SLICE A:
GRANT[0A]=((9>(BUFF_GRANT_COUNT[0A]+PROD_OUT[0A]-BUFF_OUT[0A]+PREV_GRANT[0]-GRANT_KNOWN[0])) OR ACTIVE_PROD_NOT_TWO) AND (10>(BUFF_GRANT_COUNT[0A]+CON_COUNT[0A]+PROD_OUT[0A]-CON_OUT[0A]+PREV_GRANT[0]-GRANT_KNOWN[0]));

BUFF_GRANT_COUNT[0A]_NEW=BUFF_GRANT_COUNT[0A]_OLD+PROD_OUT[0A]-BUFF_OUT[0A]+PREV_GRANT[0]-GRANT_KNOWN [0];

CON_COUNT[0A]_NEW=CON_COUNT[0A]_OLD+BUFF_OUT[0A]-CON_OUT[0A];

FURTHER EQUATIONS SPECIFIC TO CORE 0:
GRANT/HOLD[0]=GRANT[0A] AND GRANT[0B] AND GRANT[0C] AND GLOB_UTIL_GRANT[0];

PREV_GRANT[0]_NEW=GRANT/HOLD[0];

SHIFT_REG_STAGE1[0]_NEW=GRANT/HOLD[0];

SHIFT_REG_STAGE2[0]_NEW=SHIFT_REG_STAGE1[0];

SHIFT_REG_STAGE3[0]_NEW=SHIFT_REG_STAGE2[0];

SHIFT_REG_STAGE4[0]_NEW=SHIFT_REG_STAGE3[0];

SHIFT_REG_STAGE5[0]_NEW=SHIFT_REG_STAGE4[0];

GRANT_KNOWN[0]_NEW=SHIFT_REG_STAGE5[0];

Equation complexity can be further reduced by eliminating CON_COUNT[0A], using instead a composite counter CON_BUFF_GRANT_COUNT[0A], which maintains the sum of counters CON_COUNT[0A] and BUFF_GRANT_COUNT[0A]. This modification yields the following set of simplified core 0 equations:

EQUATIONS SPECIFIC TO CORE 0, SLICE A:
GRANT[0A]=((9>(BUFF_GRANT_COUNT[0A]+PROD_OUT[0A]-BUFF_OUT[0A]+PREV_GRANT

Figure 7:
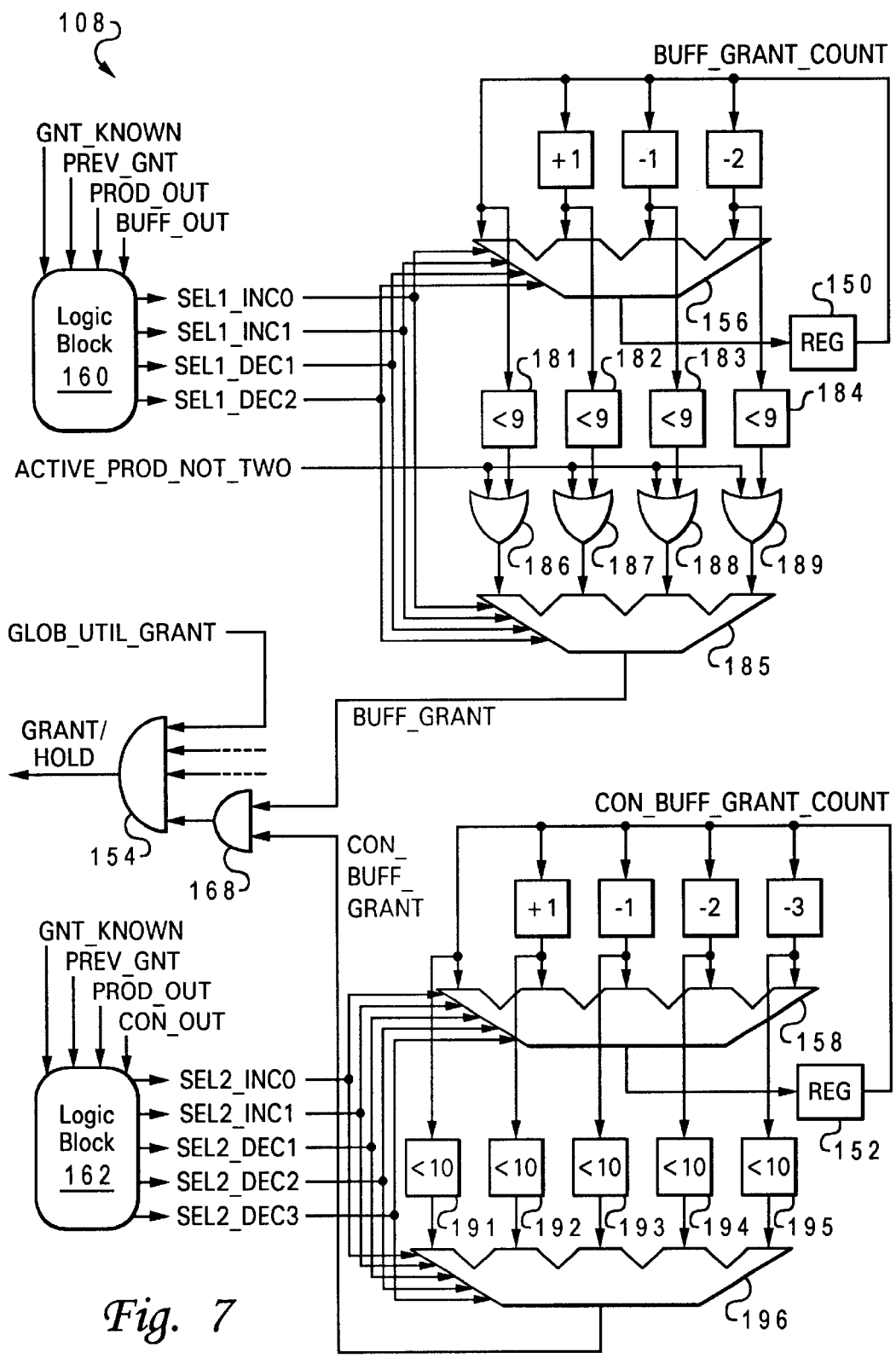
FIG. 7 is a more detailed block diagram of an exemplary embodiment of the control unit depicted in FIG. 6.

[0]-GRANT_KNOWN[0])) OR ACTIVE_PROD_ NOT_TWO) AND (10>(CON_BUFF_GRANT_ COUNT[0A]+PROD_OUT[0A]-CON_OUT[0A]+ PREV_GRANT[0]-GRANT_KNOWN[0]));

BUFF_GRANT_COUNT[0A]_NEW=BUFF_GRANT_ COUNT[0A]_OLD+PROD_OUT[0A]-BUFF_OUT [0A]+PREV_GRANT[0]-GRANT_KNOWN[0];

CON_BUFF_GRANT_COUNT[0A]_NEW=CON_ BUFF_GRANT_COUNT[0A]_OLD+PROD_OUT [0A]-CON_OUT[0A]+PREV_GRANT[0]-GRANT_ KNOWN[0];

FURTHER EQUATIONS SPECIFIC TO CORE 0:
GRANT/HOLD[0]=GRANT[0A]AND GRANT[0B] AND GRANT[0C]AND GLOB_UTIL_GRANT[0];

PREV_GRANT[0]_NEW=GRANT/HOLD[0];

SHIFT_REG_STAGE1[0]_NEW=GRANT/HOLD[0];

SHIFT_REG_STAGE2[0]_NEW=SHIFT_REG_ STAGE1[0];

SHIFT_REG_STAGE3[0]_NEW=SHIFT_REG_ STAGE2[0];

SHIFT_REG_STAGE4[0]_NEW=SHIFT_REG_ STAGE3[0];

SHIFT_REG_STAGE5[0]_NEW=SHIFT_REG_ STAGE4[0];

GRANT_KNOWN[0]_NEW=SHIFT_REG_STAGE5 [0];

Focussing now on structural and timing (i.e., logic propagation delay) optimizations, FIG. 7 illustrates an exemplary embodiment of control logic 108 that further reduces the set of equations set forth above. For simplicity, FIG. 7 illustrates the hardware for only one of the three slices (i.e., information control paths). The embodiment shown in FIG. 7 focusses specifically on minimizing logic propagation delay within a clock tick, with particular attention to reducing the logic propagation delay between the receipt of input signals and the latching of output and counter data at the end of a clock tick, effectively reducing the latency pressure associated with input signals by tolerating their arrival later within a clock tick. This tolerance is achieved by replicating some portions of the logic to speculatively generate multiple possible outcomes before the values of the input signals are known and later selecting the correct outcome based upon the input signals.

Decomposition of the GRANT/HOLD equation reveals the following basic structure:

(GRANT)=(GRANT_A) AND (GRANT_B) AND (GRANT_C) AND (INPUT_1);

Decomposition of the GRANT_i equation for each slice reveals the following basic structure:

(GRANT_i)=((CONSTRAINT_i1) OR (INPUT_2)) AND (CONSTRAINT_i2);

Decomposition of (CONSTRAINT_i1) and (CONSTRAINT_i2) reveals similar structures:

(CONSTRAINT_ij)=(VALUE_j)>((COUNTER_ij)+ (SUMMED_INPUTS_ij));

Decomposition of the counter recalculation equations for each slice reveals the following basic structure:

(NEW_COUNTER_ij)=(OLD_COUNTER_ij)+ (SUMMED_INPUTS_ij);

The logic associated with BUFF_GRANT_COUNT is constructed with the recognition that (SUMMED_ INPUTS_i1), i.e., (PROD_OUT[0A]-BUFF_OUT [0A]+PREV_GRANT[0]-GRANT_KNOWN[0]), is restricted to one of five possible values (−2, −1, 0, +1, +2). The logic is constructed with the further recognition that the relationship between PROD_OUT[0A] and GRANT_KNOWN[0] (i.e., their sum must be either zero or minus one, since they comprise the correction of mis-speculation, which can only be pessimistic and never optimistic) insures that a +2 value can never result, yielding only four possible values (−2, −1, 0, +1) for (SUMMED_INPUTS_i1).

To optimize timing as mentioned above, the dependency between the generation of (SUMMED_INPUTS_i1) and the use of (SUMMED_INPUTS_i1) in dependent logic is eliminated. That is, each of four possible values of (SUMMED_INPUTS_i1) is added to (COUNTER_i1) 150 before (SUMMED_INPUTS_i1) is known, producing four speculative outputs. Each speculative output is routed to multiplexer 156, which selects the correct value, and to four comparators 181–184. Each comparator produces one of four speculative values of (CONSTRAINT_i1). Each comparator output value is logically ORed with ACTIVE_ PROD_NOT_TWO via a respective one of OR gates 186–189 and routed to multiplexer 185, which selects the correct value.

Four select signals corresponding to each of the four possible values of (SUMMED_INPUTS_i1) are generated by logic block 160. Multiplexer 156 utilizes these select signals to select the correct value for BUFF_GRANT_ COUNT_NEW (i.e., register 150), and multiplexer 185 utilizes the select signals to select the correct value of (CONSTRAINT_i1 OR ACTIVE_PROD_NOT_TWO), which is routed to AND gate 168.

Logic block 160, which utilizes inputs PROD_OUT, BUFF_OUT, PREV_GRANT, and GRANT_KNOWN to produce select signals SEL1_INC0, SEL1_INC1, SEL1_ DEC1, and SEL1_DEC2, implements the equations specified below.

First, sub-equations that can be manipulated easily are created:

P_INC1=PREV_GRANT AND NOT GRANT_KNOWN;
P_DEC1=NOT PREV_GRANT AND GRANT_ KNOWN;
N1_INC1=PROD_OUT AND NOT BUFF_OUT;
N1_DEC1=NOT PROD_OUT AND BUFF_OUT;
Next, the sub-equations are used to develop mutually exclusive equations for the multiplexer selects for multiplexers 156 and 185:
SEL1_INC1=(N1_INC1 AND NOT P_INC1 AND NOT P_DEC1) OR (NOT N1_INC1 AND NOT N1_DEC1 AND P_INC1);
SEL1_DEC1=(N1_DEC1 AND NOT P_INC1 AND NOT P_DEC1) OR (NOT N1_INC1 AND NOT N1_DEC1 AND P_DEC1);

SEL1_DEC2=N1_DEC1 AND P_DEC1; and
SEL1_INC0=NOT SEL1_INC1 AND NOT SEL1_DEC1 AND NOT SEL1_DEC2;

The logic associated with CON_BUFF_GRANT_COUNT is constructed with the recognition that (SUMMED_INPUTS_i2), i.e., (PROD_OUT[0A]−CON_OUT[0A]+PREV_GRANT[0]−GRANT_KNOWN[0]), is restricted to one of six possible values (−3, −2, −1, 0, +1, +2) since CON_OUT[0A] may be (−2, −1, or 0). The logic is constructed with the further recognition that the relationship between PROD_OUT[0A] and GRANT_KNOWN[0] (i.e., their sum must be either zero or minus one, since they comprise the correction of mis-speculation, which can only be pessimistic and never optimistic) insures that a +2 value can never result, yielding only five possible values (−3, −2, −1, 0, +1) for (SUMMED_INPUTS_i2).

To optimize timing as mentioned above, the dependency between the generation of (SUMMED_INPUTS_i2) and the use of (SUMMED_INPUTS_i2) in dependent logic is eliminated. That is, each of five possible values of (SUMMED_INPUTS_i2) is added to (COUNTER_i2) 152 before (SUMMED_INPUTS_i2) is known, producing five speculative outputs. Each speculative output is routed to multiplexer 158, which selects the correct value, and to one of five comparators 191–195. Each of comparators 191–195 produces one of five speculative values of (CONSTRAINT_i2). Each such value is routed to multiplexer 196, which thereafter selects the correct value.

Five multiplexer select signals corresponding to the five possible values of (SUMMED_INPUTS_i2) are generated by logic block 162. These select signals are used by multiplexer 158 to select the correct value for CON_BUFF_GRANT_COUNT_NEW (register 152) and by multiplexer 196 to select the correct value of (CONSTRAINT_i2), which is routed to AND gate 168.

Logic block 162, which utilize inputs PROD_OUT, CON_OUT, PREV_GRANT, and GRANT_KNOWN to produce enable signals SEL2_INC0, SEL2_INC1, SEL2_DEC1, SEL2_DEC2, and SEL2_DEC3, specified as set forth below. First, sub-equations that can be manipulated easily are created. Note that in the present embodiment, CON_OUT is composed of two binary signals, CON_POP and CON_GTHR, which are used here:

N2_INC1=PROD_OUT AND NOT CON_POP AND NOT CON_GTHR;
N2_DEC1=(NOT PROD_OUT AND CON_POP AND NOT CON_GTHR) OR (NOT PROD_OUT AND NOT CON_POP AND CON_GTHR); and
N2_DEC2=NOT PROD_OUT AND CON_POP AND CON_GTHR;

Next, these sub-equations are used to develop mutually exclusive equations for the multiplexer selects for multiplexers 158 and 196. Note also that P_INC1 and P_DEC1, which were defined above, are used here also:
SEL2_INC1=(N2_INC1 AND NOT P_INC1 AND NOT P_DEC1) OR (NOT N2_INC1 AND NOT N2_DEC1 AND NOT N2_DEC2 AND P_INC1);
SEL2_DEC1=(N2_DEC1 AND NOT P_INC1 AND NOT P_DEC1) OR (NOT N2_INC1 AND NOT N2_DEC1 AND NOT N2_DEC2 AND P_DEC1) OR (N2_DEC2 AND P_INC1);
SEL2_DEC2=(N2_DEC2 AND NOT P_INC1 AND NOT P_DEC1) OR (N2_DEC1 AND P_DEC1);
SEL2_DEC3=N2_DEC2 AND P_DEC1;
SEL2_INC0=NOT SEL2_INC1 AND NOT SEL2_DEC1 AND NOT SEL2_DEC2 AND NOT SEL2_DEC3;

The output of AND gate 168, which is GRANT[0A], is routed to AND gate 154 along with signals GRANT[0B] and GRANT[0C] (not shown) and GLOB_UTIL_GRANT. AND gate 154 outputs the GRANT/HOLD signal.

Assuming a logic gate library with one-input to four-input logic gates, the worst-case path from PROD_OUT to GRANT/HOLD is less than or equal to ten logic gates of propagation delay. Utilizing the techniques illustrated here, those skilled in the art may derive alternate optimizations within the spirit and scope of the equations described here via various well known manual and automated logic synthesis techniques.

As has been described, the present invention provides methods and systems for controlling the flow of information between a memoriless producer and a consumer in a high frequency digital system. The digital systems to which the present invention is applicable have varying topologies, including multiple producer and multiple consumer topologies, and varying design constraints. In each implementation, information flow is improved while information loss is avoided by utilizing known latencies and component capacities to optimize pessimistic speculation regarding information flow.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to digital systems generally and an exemplary hardware embodiment of such digital systems, it should be understood that information flow control functions of the present invention are not limited to realization in logic hardware, but rather may be implemented as hardware, software, firmware or a combination of these. Further, the information flow control functions of the present invention may also be implemented as a program product for use with a information handling or data processing system. Programs defining the functions of the present invention can be delivered to such systems via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of dynamically controlling ongoing packet flow from a producer among multiple producers to at least one consumer via an information pipeline containing an intermediate shared resource having a bandwidth, said method comprising:

at a control unit, receiving as inputs producer output indications each indicating that the producer has output a packet and shared resource input indications each indicating that a packet previously output by the producer has been accepted by said shared resource for transmission to said at least one consumer;

at said control unit, repetitively determining during ongoing packet flow from the producer to said at least one consumer whether said producer can output a packet without packet loss based upon how many packets have been output by said producer as indicated by said producer output indications, how many packets have been input into said shared resource as indicated by said shared resource input indications, bow many packets said control unit has permitted to be output by said producer as indicated by grant messages transmitted to said producer within a feedback latency of said control unit, and a portion of said bandwidth allocated to said producer, wherein said feedback latency includes a first latency for a producer output indication to reach said control unit from said producer and a second latency for a grant message generated by said control unit to reach said producer from said control unit and wherein said control unit determines whether said producer can output a packet without packet loss independently of any signaling by said at least one consumer; and in response to a determination that said producer can output a packet without packet loss, said control unit generating and outputting a grant message to said producer indicating that said producer is permitted to output a packet.

2. The method of claim 1, wherein said information pipeline includes a buffer having a buffer capacity, and wherein said determination is further based upon a number of packets within said buffer and said buffer capacity.

3. The method of claim 2, wherein determining if said producer can output a packet without packet loss comprises:

calculating a sum of said number of buffered packets and said number of grant messages output to said producer within a feedback latency of said control unit; and determining that said producer can output a packet without packet loss if said buffer capacity is larger than said sum plus a number of said producer output indications less a number of said shared resource input indications and less said portion of said bandwidth.

4. The method of claim 3, wherein calculating said sum comprises dynamically updating one or more registers maintaining said number of buffered packets and said number of grant messages.

5. The method of claim 3, and further comprising determining said portion of said bandwidth by reference to how many active producers are transmitting packets to said at least one consumer via said shared resource.

6. The method of claim 4, and further comprising dynamically determining a number of active producers by reference to a number of producers requesting permission to output a packet.

7. The method of claim 1, wherein determining if said producer can output a packet without packet loss comprises determining that said producer can output a packet without packet loss only in response to receipt by said control unit of an authorization to supply said grant message.

8. The method of claim 1, and further comprising:

in response to receipt of said grant message at said producer, outputting at least one packet, such that said producer retains no record of said at least one packet.

9. The method of claim 1, wherein said control unit determines whether said producer can output a packet without packet loss utilizing only information regarding packet flow at locations within said information pipeline at or preceding said shared resource.

10. The method of claim 1, wherein:

receiving producer output indications comprises receiving signaling from the producer separate from said information pipeline; and receiving shared resource input indications comprises receiving external signaling at said control unit separate from said information pipeline.

11. The method of claim 1, wherein said plurality of producers, said consumer and said shared resource are each implemented as components of a single integrated circuit device, and wherein said receiving, said determining and said outputting are all performed within the single integrated circuit device.

12. The method of claim 1, wherein:

each producer output indication indicates that said producer has output one packet;

each shared resource input indication indicates that said consumer has received one packet;

each grant message indicates said producer is permitted to output one packet; and said determining comprises determining based upon how many of said producer output indications and said shared resource input indications have been received by said control unit and based upon how many grant messages have been transmitted by said control unit.

13. An information handling system, comprising:

a plurality of producers that outputs packets of information and at least one consumer of said packets;

an information pipeline coupling said at least one consumer and at least a particular producer among said plurality of producers, wherein said information pipeline includes a shared resource having a bandwidth shared by multiple of said plurality of producers; and a control unit that dynamically regulates ongoing packet output of said particular producer, said control unit receiving as inputs producer output indications each indicating that said particular producer has output a packet and shared resource input indications each indicating that a packet previously output by said particular producer has been accepted by said shared resource for transmission to said at least one consumer, wherein said control unit repetitively determines during ongoing packet flow from the particular producer to said at least one consumer whether said particular producer can output a packet without packet loss based upon how many packets have been output by said particular producer as indicated by said producer output indications, how many packets have been input into said shared resource as indicated by said shared resource input indications, how many packets said control unit has permitted to be output by said particular producer as indicated by grant messages transmitted to said particular producer within a feedback latency of said control unit, and a portion of said bandwidth allocated to said particular producer, and, responsive to a determination that said particular producer can output a packet without packet loss, generates and outputs a grant message to said particular producer indicating that said particular producer is permitted to output a packet;

wherein said feedback latency includes a first latency for a producer output indication to reach said control unit from said particular producer and a second latency for a grant message generated by said control unit to reach said particular producer from said control unit; and wherein said control unit determines whether said producer can output a packet without packet loss independently of any signaling by said at least one consumer.

14. The information handling system of claim 13, wherein said information pipeline includes a buffer having a buffer capacity, and wherein said control unit further bases said determination upon a number of packets within said buffer and said buffer capacity.

15. The information handling system of claim 14, wherein said control unit determines that said particular producer can output a packet without packet loss if said buffer capacity is larger than a sum of said number of buffered packets and said number of grant messages output to said particular producer within a feedback latency of said control unit plus a number of said producer output indications less a number of said shared resource input indications and less said portion of said bandwidth.

16. The information handling system of claim 15, said control unit including one or more registers that maintain said number of buffered packets and said number of grant messages.

17. The information handling system of claim 15, wherein said control unit determines said portion of said bandwidth by reference to how many active producers among said plurality of producers are transmitting packets to said at least one consumer via said shared resource.

18. The information handling system of claim 17, and further comprising a global controller that dynamically determines a number of active producers by reference to a number of producers requesting permission to output a packet and communicates said number of active producers to said control unit.

19. The information handling system of claim 18, wherein said global controller supplies said control unit with an authorization to supply a grant message, and wherein said control unit outputs said grant message only in response to receipt of said authorization.

20. The information handling system of claim 13, wherein said particular producer is a memoriless produces that retains no record of said packets.

21. The information handling system of claim 13, wherein said control unit determines whether said particular producer can output a packet without packet loss utilizing only information regarding packet flow at locations within said information pipeline at or preceding said shared resource.

22. The information handling system of claim 13, and further comprising:
   a first signaling connection between said particular producer and said control unit separate from said information pipeline; and
   a second signaling connection between said information pipeline and said control unit for said shared resource input indications, wherein said second signaling connection is separate from said information pipeline.

23. The information handling system of claim 13, wherein said plurality of producers, said consumer and said shared resource are each implemented as components of a single integrated circuit device.

24. The information handling system of claim 13, wherein:
   each producer output indication indicates that said producer has output one packet;
   each shared resource input indication indicates that said consumer has received one packet;
   each grant message indicates said producer is permitted to output one packet; and
   said control unit determines whether said particular producer is permitted to output a packet based upon how many of said producer output indications and said shared resource input indications have been received by said control unit and based upon how many grant messages have been transmitted by said control unit.

25. A controller for dynamically controlling ongoing packet transfer from a particular producer to at least one consumer via an information pipeline including a shared resource having a bandwidth shared by multiple producers, said controller comprising:
   an input set including producer output indications each indicating that said particular producer has output a packet and shared resource input indications each indicating that a packet previously output by said particular producer has been accepted by said shared resource for transmission to said at least one consumer; and
   determination logic that repetitively determines during ongoing packet flow from the particular producer to said at least one consumer whether said particular producer can output a packet without packet loss, based upon how many packets have been output by said particular producer as indicated by said producer output indications, how many packets have been input into said shared resource as indicated by said shared resource input indications, how many packet said control unit has permitted to be output by said particular producer as indicated by grant messages transmitted to said particular producer within a feedback latency of said controller, and a portion of said bandwidth allocated to said particular producer, and, responsive to a determination that said particular producer can output a packet without packet loss, generates and outputs a grant message to said particular producer indicating that said particular producer is permitted to output a packet,
   wherein said feedback latency includes a first latency for a producer output indication to reach said control unit from said particular producer and a second latency for a grant message generated by said controller to reach said particular producer from said control unit; and
   wherein said control unit determines whether said producer can output a packet without packet loss independently of any signaling said at least one consumer.

26. The controller of claim 25, wherein said information pipeline includes a buffer having a buffer capacity, and wherein said determination logic further bases said determination upon a number of packets within said buffer and said buffer capacity.

27. The controller of claim 26, wherein said determination logic determines that said particular producer can output a packet without packet loss if said buffer capacity is larger than a sum of said number of buffered packets and said number of grant messages output to said particular producer within a feedback latency of said control unit plus a number of said producer output indications less a number of said shared resource input indications and less said portion of said bandwidth.

28. The controller of claim 27, said controller further comprising one or more registers that maintain said number of buffered packets and said number of grant messages.

29. The controller of claim 27, wherein said determination logic determines said portion of said bandwidth by reference to how many active producers among said plurality of producers are transmitting packets to said at least one consumer via said shared resource.

30. The controller of claim 25, wherein said controller outputs said grant message only in response to receipt of an authorization from a global controller.

31. The controller of claim 25, wherein said determination logic determines whether said particular producer can output a packet without packet loss utilizing only information regarding packet flow at locations within said information pipeline at or preceding said shared resource.

32. The controller of claim 25, wherein:

each producer output indication indicates that said producer has output one packet;

each shared resource input indication indicates that said consumer has received one packet;

each grant message indicates said producer is permitted to output one packet; and said determination logic determines whether said particular producer is permitted to output a packet based upon how many of said producer output indications and said shared resource input indications have been received by said control unit and based upon how many grant messages have been transmitted by said control unit.

33. A program product for dynamically controlling ongoing packet transfer from a particular producer to at least one consumer via an information pipeline including a shared resource having a bandwidth shared by multiple producers, said program product comprising:

input code that obtains an input set including producer output indications each indicating that said particular producer has output a packet and shared resource input indications each indicating that a packet previously output by said particular producer has been accepted by said shared resource for transmission to said at least one consumer; and determination code that repetitively determines during ongoing packet flow from the particular producer to said at least one consumer whether said particular producer can output a packet without packet loss based upon how many packets have been output by said particular producer as indicated by said producer output indications, how many packets have been input into said shared resource as indicated by said shared resource input indications, how many packets said control unit has permitted to be output by said particular producer as indicated by grant messages transmitted to said particular producer within a control feedback latency, and a portion of said bandwidth allocated to said particular producer, and, responsive to a determination that said particular producer can output a packet without packet loss, generates and outputs a grant message to said particular producer indicating that said particular producer is permitted to output a packet, wherein said control feedback latency includes a first latency for a producer output indication to reach said determination code from said particular producer and a second latency for a grant message generated by said determination code to reach said particular producer, and wherein said control unit determines whether said producer can output a packet without packet loss independently of any signaling by said at least one consumer; and a data processing system usable medium encoding said input code and said determination code.

34. The program product of claim 33, wherein said information pipeline includes a buffer having a buffer capacity, and wherein said determination code further bases said determination upon a number of packets within said buffer and said buffer capacity.

35. The program product of claim 34, wherein said determination code determines that said particular producer can output a packet without packet loss if said buffer capacity is larger than a sum of said number of buffered packets and said number of grant messages output to said particular producer within said control feedback latency plus a number of said producer output indications less a number of said shared resource input indications and less said portion of said bandwidth.

36. The program product of claim 35, said program product further comprising counter code that dynamically maintains said number of buffered packets and said number of grant messages.

37. The program product of claim 35, wherein said determination code determines said portion of said bandwidth by reference to how many active producers among said plurality of producers are transmitting packets to said at least one consumer via said shared resource.

38. The program product of claim 33, wherein said determination code determines whether said particular producer can output a packet without packet loss utilizing only information regarding packet flow at locations within said information pipeline at or preceding said shared resource.

39. The program product of claim 33, wherein:

each producer output indication indicates that said producer has output one packet;

each shared resource input indication indicates that said consumer has received one packet;

each grant message indicates said producer is permitted to output one packet; and said determination code determines whether said particular producer is permitted to output a packet based upon how many of said producer output indications and said shared resource input indications have been received by said control unit and based upon how many grant messages have been transmitted by said control unit.

* * * * *